Oct. 3, 1961  G. W. CRAMPTON ET AL  3,002,376
MULTI-ENGINE VIBRATION INDICATING SYSTEM
Filed Sept. 25, 1957  2 Sheets-Sheet 1
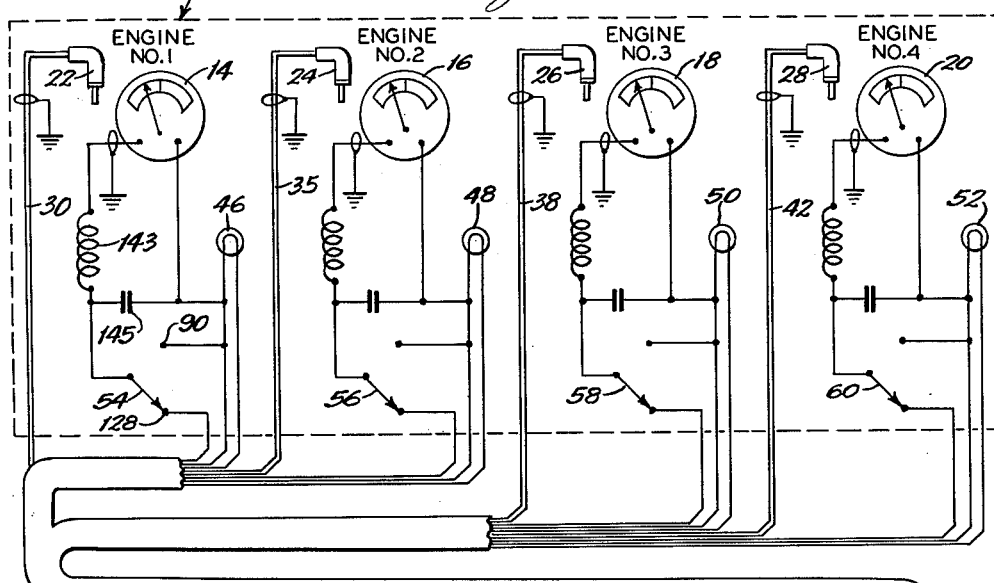
Fig.1
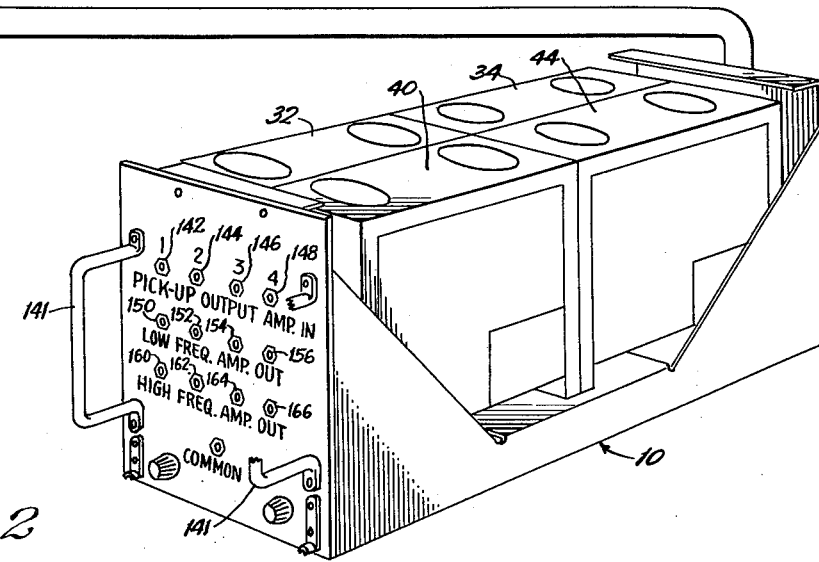
Fig.2
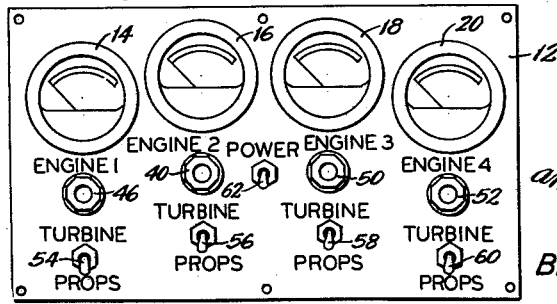
INVENTORS:
Gale W. Crampton
and Edward E. Smith;
BY Louis Kumar.
ATTORNEY.

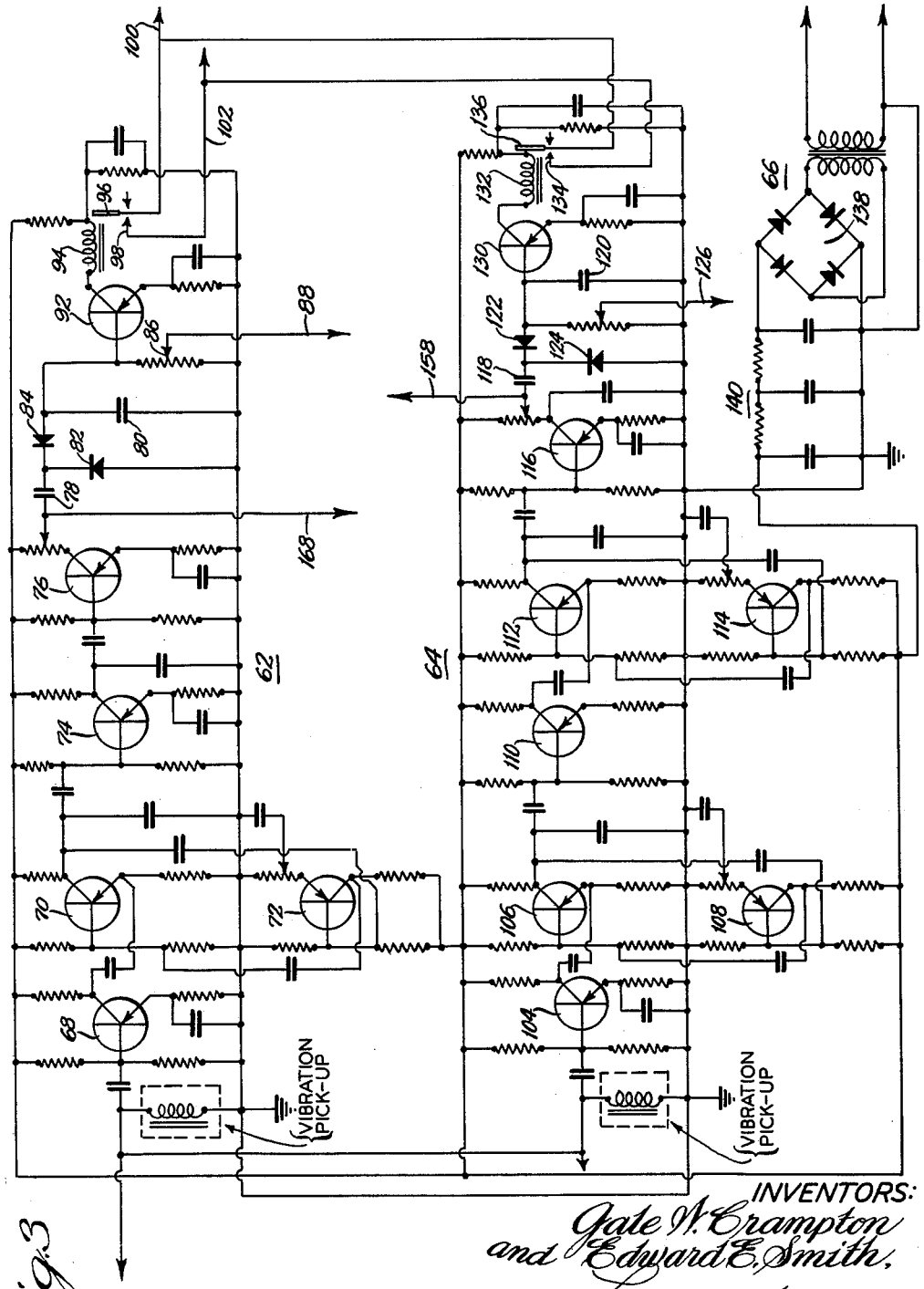

United States Patent Office 3,002,376
Patented Oct. 3, 1961

3,002,376
MULTI-ENGINE VIBRATION INDICATING SYSTEM
Gale W. Crampton, Chicago, Ill., and Edward E. Smith, Hayward, Calif., assignors to Land-Air, Inc., a corporation of Illinois
Filed Sept. 25, 1957, Ser. No. 686,162
4 Claims. (Cl. 73—116)

This invention relates generally to engine analyzers and more particularly to a new and improved engine analyzer for indicating vibration in single engine and multiple engine aircraft.

As a result of the growing complexity and power of the engines used in present day aircraft, there is correspondingly a growing need for relatively simple and accurate apparatus capable of detecting engine faults in such aircraft. Manifestly, it is desirable that such an engine analyzer comprise a minimum of equipment, be held to minimum weight and space requirements, and yet be capable of providing an accurate picture of engine operating conditions.

Various types of engine analyzers are known in the prior art, but as these devices generally comprise relatively complex, and often rather fragile, circuit components, they have not proven fully satisfactory for use with all types of modern aircraft which range from propeller and turboprop to jet engine systems.

Accordingly, it is a general object of this invention to provide a new and improved general purpose engine analyzer.

It is another object of this invention to provide an improved engine analyzer suitable for use with propeller, turbo-prop and/or jet engine systems.

It is another object of this invention to provide an improved engine analyzer, as described above, adapted to indicate double amplitude displacement at propeller and turbine vibration frequencies, and to provide warnings of dangerous vibration at either of these two frequencies.

It is a further object of this invention to provide a new and improved engine analyzer which achieves ruggedness and relatively trouble-free operation through the total elimination of all vacuum tube circuit components.

It is a still further object of this invention to provide such a new and improved engine analyzer which utilizes transistorized printed circuitry, plug-in modules, and double amplitude displacement indicating meters for reducing the size and weight of the analyzer to minimal values.

It is still another object of this invention to provide a new and improved engine analyzer having readily accessible means for permitting the operation of the analyzer to be checked in a quick and efficient manner.

It is a still further object of this invention to provide a new and improved engine analyzer, as described above, which is characterized by its compactness, its accuracy, and the relative economy of its construction and operation.

These and other objects are realized in accordance with a specific embodiment of this invention which is shown herein for purposes of illustration as particularly suitable for use with a four-engine aircraft. Clearly, it will readily be understood that the invention is in no way limited to use with four-engine aircraft engines, and may equally advantageously be used for analyzing vibration in aircraft with different numbers of engines and in other types of prime movers.

For the purposes of illustration, the invention will be disclosed as used with aircraft engines of the type in which excessive vibrations of either the propeller shaft or the turbine shaft generally are not discernible by the pilot. These vibrations, if excessive, are a warning of engine failure, and advantageously, the invention serves as an efficient and accurate means for detecting these vibrations before dangerous engine failure can occur.

In accordance with several features of the invention, a vibration pickup, which may be of the magneto striction or other suitable type, is mounted at each engine, as for example, on a boss at the exhaust funnel of the engine.

As well known in the art, the magneto striction pickup generates a sinusoidal voltage by a change of the reluctance path in the pickup. This voltage, which is an indication of the acceleration, is applied to the compact plug-in type module which houses low and high frequency channel transistor amplifiers for propeller and turbine engines, respectively.

Each amplifier is provided with a switch for selecting the frequency band channel to be utilized. This depends on whether the engine is of the propeller or the turbine type, and the pickup output voltage is fed into the proper frequency band channel where it is amplified and integrated. The integrated output voltage of each amplifier is a measure of the actual displacement amplitude of the pick-up and this output voltage is applied to a displacement meter which indicates a double amplitude displacement of the vibration in each engine.

It is a further feature of this invention that the integrated output voltage from each amplifier channel also is applied to a biased relay control circuit. When the current flow exceeds the current which would normally flow when vibrations are not excessive, the relay is actuated to operate a warning light which serves to call the pilot's attention to the dangerous vibration.

It is a still further feature of this invention that the plug-in type rack chassis housing the amplifier modules is provided with a plurality of test jacks for facilitating checking of the pickup and amplifier operation.

The above and other features of novelty which characterize the invention are pointed out with particularity in the claims annexed to and forming a part of this specification. For a better understanding of the invention, however, its advantages and specific objects attained with its use, reference is had to the accompanying drawing and descriptive matter in which is shown and described an illustrative embodiment of the invention.

In the drawing:

FIGURE 1 is a partially schematic and partially pictorial view of the indicating and channel selection panel together with the plug-in type rack amplifier chassis embodying the invention;

FIGURE 2 is a front elevational view of the indicating and channel selection panel; and FIGURE 3 is a schematic diagram of a low frequency and high frequency channel transistor amplifier in accordance with the invention.

Referring now to the drawing, and more particularly to FIGURES 1 and 2, there is shown a specific illustrative embodiment of an engine vibration analyzer embodying principles of the invention. For the purposes of illustration, the invention is disclosed as an engine vibration analyzer adapted to be used with a four-engine aircraft of either the propeller or turbine type. However, it will readily be understood by those skilled in the art that the invention is in no way limited to use with four-engine aircraft and that it may be used with equally satisfactory results for analyzing vibrations in a large variety of vehicles having different numbers of engines.

The illustrative engine vibration analyzer described herein comprises a plug-in type rack amplifier chassis, indicated generally at 10, and an indicating and channel selection panel, indicated generally at 12, and adapted to be positioned remote from the amplifier chassis 10.

Advantageously, the indicating and channel selection panel 12 is integral with or near the aircraft instrument panel so as to be readily accessible to the pilot of the aircraft, and the amplifier chassis 10 may be positioned at any suitable location in the aircraft.

The indicating and channel selection panel 12 comprises an indicating meter for each engine in the aircraft and thus, the meters 14, 16, 18 and 20 are adapted to indicate the vibration of engines 1, 2, 3 and 4 of the four-engine aircraft in the instant example. A vibration pickup is associated with each engine—pickup 22 with engine number 1, pickup 24 with engine number 2, pickup 26 with engine number 3, and pickup 28 with engine number 4—and advantageously, the pickup is mounted in a suitable location adjacent its associated engine, as for example, on a boss located at the exhaust funnel of its engine. Although it will be readily appreciated by those skilled in the art that the vibration pickup may take any suitable form, such as a piezoelectric crystal, a magnetic transducer, or a magneto striction transducer, in a preferred embodiment of the invention, the vibration pickup is of the magneto stirction type and comprises a steel shell having a permanent magnet surrounded by a coil housed therein. It will readily be understood that the magneto striction pickup positioned at each engine serves to transform the mechanical vibrations of the engine into electrical signals. The magnetic field of the permanent magnet surrounds the coil, but without a mechanical stress on the pickup, this field remains constant. When the engine is in operation, vibrations from the cylinder wall exert a mechanical stress on the permanent magnet and cause the generation of a fluctuating magnetic field. This fluctuating magnetic field induces an electromagnetic force into the coil surrounding the magnet, the strength of which is dependent upon the amount of vibration. The construction and operation of magneto striction transducers are well understood, and as there are many such magneto striction transducers suitable for use with the invention, the details of the transducer need not be further disclosed herein.

In accordance with the invention, the magneto striction pickup 22 is connected by conductors 30 to an electronic amplifying, compensating and integrating network in the module 32 positioned in the amplifier chassis 10. In a similar manner, pickup 24 is connected by conductors 35 to the electronic circuits in module 34, pickup 26 is connected by conductors 38 to the circuits in module 40, and pickup 28 is connected by conductors 42 to the electronic circuits in module 44.

The integrated output of the electronic circuitry in each module is a measure of the actual displacement amplitude of its associated magneto striction pickup and, in the manner explained in greater detail below, this output is applied to its indicating meter for providing a double amplitude displacement of the vibration in the engine associated therewith. In addition, the integrated output voltage is applied to a relay control stage in each module and when the engine vibration exceeds a predetermined level, the relay is energized to operate a warning light associated with each engine. Thus, a warning light 46 is positioned adjacent indicating meter 14, warning light 48 is positioned adjacent indicating meter 16, warning light 50 is positioned adjacent indicating meter 18, and a warning light 52 is positioned adjacent indicating meter 20, all in the indicating and channel selection panel 12.

It will be appreciated by those skilled in the art that aircraft engines of the propeller type vibrate at lower frequencies than engines of the turbine type. It is a feature of this invention that the engine vibration analyzer is adaptable for either type of engine by the provision of electronic amplifier circuitry in each module having both a low frequency and a high frequency channel. Selection of the proper channel may be made as desired by means of special channel selector switches provided at the indicating and channel selection panel 12.

Thus, channel selection switch 54 is provided for engine number 1 and is positioned adjacent indicating meter 14 and warning light 46, channel selection switch 56 is provided for engine number 2 and is positioned adjacent indicating meter 16 and warning light 48, channel selection switch 58 is provided for engine number 3 and is positioned adjacent indicating meter 18 and warning light 50, and channel selection switch 60 is provided for engine number 4 and is positioned adjacent indicating meter 20 and warning light 52. In addition, a power switch 62 is provided on the indicating and channel selection panel 12 for enabling the engine vibration analyzer to selectively be turned on and off.

The dual channel electronic circuitry within each module of the amplifier chassis 10 advantageously may take the form of the circuit shown in FIGURE 3, which comprises a high frequency channel 62, a low frequency channel 64 and a power supply 66. The high frequency channel 62 consists of five stages and provides an output corresponding electrically to the mechanical displacement caused by high frequency vibrations, as for example, 140 to 250 cycles per second. The high frequency channel 62 includes a preamplifier stage including the transistor 68 to which is applied the output of the magneto striction vibration pickup.

The output of the preamplifier transistor 68 is applied to a compensating band pass filter network which is adapted to produce an output response that is a true indication of the magnitude of the actual high frequency displacement of the pickup. The compensating band pass filter network comprises a pair of stages including transistors 70 and 72, connected in push-pull, and having their output applied to a transistor 74. It will be understood by those skilled in the art that the compensating band pass filter network serves to compensate for the characteristics of the magneto striction pickup. Thus the mechanical masses of the magnetostriction pickup assembly will have a natural or resonant frequency of vibration, and to the end that the circuit responds only to the frequency of the engine under test and not to the natural frequency of the pickup assembly, the band pass filter serves to block any natural frequency component which might be present in the magnetostriction pickup output. Accordingly, the band pass filter compensates for natural frequency characteristic of pickup mechanical mass and passes only the frequencies of engine vibration.

The output of the compensating band pass filter network is applied to a power stage including the transistor 76 which reproduces with high gain the output from the filter network. The output of the power stage transistor 76 is fed into a voltage doubler and filter network, comprising condensers 78 and 80 and the rectifiers 82 and 84, which provides a D.C. voltage proportional to the signal magnitude at the output of the power stage. This D.C. voltage is applied over the potentiometer wiper 86 and conductor 88 to the high frequency contact of the channel selector switch associated with the amplifier. Thus, in engine number 1, for example, the output conductor 88 of the high frequency channel 62 in the amplifier is connected to contact 90 associated with the channel selector switch 54 such that the indicating meter 14 connected to switch 54 through inductance 143 and capacitance 145, may provide a visual indication of the high frequency engine vibration.

In addition, the D.C. voltage output of the voltage doubler stage biases the transistor 92 of the relay control stage in the high frequency channel 62. A relay coil 94 is connected to the transistor 92 and when the bias voltage exceeds a predetermined amount, to indicate excessive vibration, the relay is actuated to close its contacts 96 and 98. A circuit is then closed between power conductor 100 and conductor 102 which, in turn, is connected to the warning light in the indicating and channel selection panel 12. Thus, in engine number 1, for example, the actuation of relay coil 94 closes the circuit for warning light 46 to provide a visual indication of an excessive vibration in engine number 1.

The low frequency channel in each module is somewhat similar to the high frequency channel and comprises six stages which provide an output corresponding electrically to the mechanical displacement caused by low frequency vibrations, as for example, 7 to 80 cycles per second. The low frequency channel 64 comprises a preamplifier stage including the transistor 104, a compensating band pass filter network of three stages including transistors 106 and 108 connected in push-pull, transistor 110, and transistors 112 and 114 connected in push-pull, a power stage including transistor 116 and a voltage doubler and filter including condensers 118 and 120 and rectifiers 122 and 124.

The preamplifier stage provides the high gain and low noise ratio necessary to amplify the low input signal from the magneto striction pickup. The three stage compensating band pass filter network produces an output response which is a direct indication of the magnitude of the actual low frequency displacement of the pickup and, as explained above, serves to compensate for the characteristics of the magneto striction pickup. The power stage reproduces at high gain, the output of the band pass filter network, and the voltage doubler and filter network provides a D.C. voltage proportional to the magnitude of the input voltage applied thereto.

This D.C. output voltage is applied over conductor 126 to the low frequency contact of the frequency band channel switch associated therewith. For example, in the case of engine number 1, conductor 126 is connected to low frequency contact 128 associated with channel selection switch 54.

The D.C. voltage output of the voltage double stage also is used to bias the transistor 130 of the low frequency relay control stage such that the excessive vibrations of the engine causes the transistor to energize relay 132. This closes the circuit between relay contacts 134 and 136 to light the warning light on the indicating and channel selection panel 12.

The power supply 66 for the high and low frequency channels may take any suitable form such as the full wave rectifier 138 and R.C. filter network 140 shown in FIGURE 3. Manifestly, any other suitable power supply circuit may be used in lieu of the illustrative power supply circuit 66 shown in FIGURE 3 with equally satisfactory results. Similarly, other types and numbers of amplifier stages may be utilized in lieu of the illustrative stages shown in FIGURE 3 and described above, without departing from the spirit and principles of the invention.

It is a feature of this invention that the construction, maintenance and repair of the novel engine vibration indicating apparatus is facilitated by the use of replaceable modules 32, 34, 40 and 44 respectively, and by the use of plug-in type rack chassis 10 housing the amplifier modules. Insertion and removal of chassis 10 is aided by means of handles 141 mounted at the front panel of the chassis. In addition, checking of the pickup and amplifier operation is simplified by means of a plurality of test jacks provided at the front panel of the chassis 10. Thus, the output of the vibration pickups 22, 24, 26 and 28, each are connected to the test jacks 142, 144, 146 and 148 respectively. It will be appreciated that this construction enables the operation of each vibration pickup to be checked whenever desired in an easy and readily accessible manner.

In addition, the operation of the low frequency amplifier channel in each module may be tested by means of a plurality of test jacks, such as test jacks 150, 152, 154 and 156 connected to the low frequency amplifiers in modules 32, 34, 40 and 44 respectively. A suitable conductor such as conductor 158 connected to the output of the power stage transistor 116 in FIGURE 3 is provided to connect each test jack to its associated low frequency channel amplifier.

In a similar manner, the operation of the high frequency channel amplifiers in each of the modules may be checked by means of the test jacks 160, 162, 164 and 166 connected to the high frequency channels in modules 32, 34, 40 and 44 respectively. A conductor, such as conductor 168, connected to the output of the power stage transistor 76 in FIGURE 3, serves to connect the output of each high frequency channel to its associated test jack.

In accordance with an aspect of this invention, the indicating meter for each engine indicates a doube amplitude displacement of vibration in each engine. Thus, when the engine vibration produces a double displacement of .0025 inches for example, the meter shows a half scale indication regardless of the frequency of the displacement. If the double amplitude exceeds .0025 inch, the danger level, the meter indicates the amount of excess vibration and the warning light associated with the meter is energized.

Thus, there has been shown and described a novel engine vibration indicating system which is adapted for use with either propeller or turbine engines and with single or multi-engine systems. A switch is provided for each engine so that the frequency band channel to be monitored, propeller or turbine, may be selected as required. A plug-in type module is associated with a vibration pickup mounted adjacent each engine and in accordance with features of the invention, the module houses printed circuit boards for a low and high frequency channel transistorized amplifier, the high frequency channel being adapted for use with a turbine-type engine and the low frequency channel being adapted for use with the propeller-type engine. The amplifier provides a D.C. voltage proportional to the engine vibration to excite a displacement meter which indicates double ampliutde displacement in each engine. In addition, excess vibration results in the actuation of a relay, in either the low or high frequency channel amplifier, which, in turn, operates a warning light to warn of engine failure. The invention is particularly useful in detecting excessive vibrations of either the propeller shaft or the turbine shaft of turbo jet engines which are not discernible by the pilot. As these vibrations are a warning of possible engine failure, the invention provides the pilot with a means to detect these vibrations before such failures occur.

It will be appreciated by those skilled in the art that the above disclosed specific embodiments are merely illustrative of the principles of the invention and that modifications may be made in the construction and arrangement of the parts of the above-described engine vibration analyzing apparatus without departing from the real spirit and scope of the invention and that it is intended to cover by the appended claims any modified forms of the structure or use of equivalents which reasonably may be used within their scope.

What is claimed as the invention is:

1. A vibration analyzer for a multi-engine system comprising magneto striction vibration pickup means operatively associated with each engine for producing electrical voltages having characteristics corresponding to the acceleration component of engine vibrations, a dual channel amplifier connected to the output of each magneto striction vibration pickup means, said dual channel amplifier comprising a low frequency channel including amplifying means for said electrical voltages, a band pass filter network coupled to said amplifying means to compensate for pickup characteristics, an integrating network coupled to said band pass filter network for integrating said electrical voltages to provide D.C. voltages proportional to engine displacement due to engine vibrations at propeller frequencies, and a relay control circuit coupled to the output of said integrating network and adapted to be energized in response to excessive vibrations for lighting a warning light, said dual channel amplifier further comprising a high frequency channel including amplifying means for said electrical voltages, a band pass filter network coupled to said amplifying means to compensate for the pickup characteristics, an integrating network coupled to said band pass filter network for integrating said electrical voltages to provide D.C. voltages proportional to engine displacement due to engine vibrations at turbine frequencies, and a relay control circuit for lighting a warning light when said turbine vibration frequencies exceed a predetermined displacement value, an indicating meter for producing double amplitude displacement indications of the engine vibrations, a warning light, selectively actuatable switch means for connecting the output of the integrating network in either said high frequency channel or said low frequency channel to said displacement meter and warning light, and a plurality of accessible test points connected to the output of said pickup, said low frequency channel and said high frequency channel for each engine to facilitate checking of the pickup and amplifier operation.

2. An engine vibration analyzer comprising vibration pickup means for producing electrical voltages having characteristics corresponding to the acceleration component of the engine vibrations, a dual channel amplifier connected to the output of said vibration pickup means, said dual channel amplifier comprising a high and a low frequency channel each including amplifying means for said electrical voltages, a band pass filter network coupled to said amplifying means to compensate for the characteristics of the pickup, an integrating network coupled to said band pass filter network for integrating said electrical voltages to provide D.C. voltages proportional to engine displacement due to engine vibrations, an indicating meter connected to said integrating network for producing visual indications of the engine displacement, a warning light, and a relay control circuit coupled to the output of said integrating network and adapted to be energized in response to excessive vibration displacement for lighting said warning light, and selectively actuatable switch means for connecting the output of either said high frequency channel or said low frequency channel to said displacement meter and warning light.

3. A compact vibration analyzer for a multi-engine aircraft, comprising vibration pickup means for each engine adapted to provide electrical voltages having characteristics corresponding to the acceleration component of the engine vibrations, dual channel amplifier means connected to the output of each vibration pickup means, comprising a low frequency channel for amplifying engine vibration at propeller frequencies, and a high frequency channel for amplifying engine vibration at turbine frequencies, each channel in said amplifier means having a plurality of transistor stages including an integrating network for integrating said electrical voltages to provide D.C. voltages proportional to engine displacemnet due to engine vibrations, an indicating meter for each engine, selectively actuatable switch means for connecting the D.C. voltage output of either the high or low frequency channel in each dual channel amplifier means to its associated meter to provide selective indications of engine vibration displacement at either of said frequencies.

4. A compact vibration analyzer for multi-engine aircraft in accordance with claim 3 further comprising a warning light for each engine, and a relay control circuit responsive to said D.C. voltages for lighting said warning light when said vibrations exceed a predetermined displacement value.

References Cited in the file of this patent
UNITED STATES PATENTS

| | | |
|---|---|---|
| 2,340,714 | Traver et al. | Feb. 1, 1944 |
| 2,352,219 | Olesen | June 27, 1944 |
| 2,361,990 | Brown | Nov. 7, 1944 |
| 2,412,240 | Williams et al. | Dec. 10, 1946 |
| 2,468,648 | Abbott et al. | Apr. 26, 1949 |